(12) United States Patent
Shi et al.

(10) Patent No.: US 12,320,488 B2
(45) Date of Patent: Jun. 3, 2025

(54) LIGHT GUIDING DEVICE, VEHICLE LAMP AND VEHICLE

(71) Applicant: VALEO VISION, Bobigny (FR)

(72) Inventors: Xingang Shi, Foshan (CN); Yanna Chen, Foshan (CN); Zebin Ni, Foshan (CN)

(73) Assignee: VALEO VISION, Bobigny (FR)

(*) Notice: Subject to any disclaimer, the term of this patent is extended or adjusted under 35 U.S.C. 154(b) by 0 days.

(21) Appl. No.: 18/557,004

(22) PCT Filed: Apr. 25, 2022

(86) PCT No.: PCT/CN2022/088871
§ 371 (c)(1),
(2) Date: Oct. 24, 2023

(87) PCT Pub. No.: WO2022/228354
PCT Pub. Date: Nov. 3, 2022

(65) Prior Publication Data
US 2024/0200750 A1 Jun. 20, 2024

(30) Foreign Application Priority Data

Apr. 26, 2021 (CN) .......................... 202120876420.1

(51) Int. Cl.
*F21S 43/237* (2018.01)
*F21S 43/20* (2018.01)
(Continued)

(52) U.S. Cl.
CPC ........... *F21S 43/237* (2018.01); *F21S 43/245* (2018.01); *F21S 43/26* (2018.01); *G02B 6/0045* (2013.01)

(58) Field of Classification Search
CPC ............................. F21S 43/237; F21S 43/245
See application file for complete search history.

(56) References Cited

U.S. PATENT DOCUMENTS

2006/0193144 A1 8/2006 Braeutigam et al.
2010/0254152 A1* 10/2010 Taleb-Bendiab ...... F21S 43/245
362/487
(Continued)

FOREIGN PATENT DOCUMENTS

CN 107388159 A 11/2017
CN 211316061 U 8/2020
(Continued)

OTHER PUBLICATIONS

International Search Report issued Jul. 25, 2022 in PCT/CN2022/088871 filed on Apr. 25, 2022, 5 pages.
(Continued)

*Primary Examiner* — Eric T Eide
(74) *Attorney, Agent, or Firm* — Oblon, McClelland, Maier & Neustadt, L.L.P.

(57) ABSTRACT

A light guiding device includes a first light guide having an end surface, a corner section and a downstream section. The corner section of the first light guide has a corner and is closer to the end surface of the first light guide than the downstream section. Light incident surfaces of the first light guide include the end surface, and an inner side surface of the corner section located on the inner side of the corner. A light exit surface of the first light guide includes an outer side surface of the first light guide located on the outer side of the corner. The light incident surfaces of the first light guide may additionally include the inner side surface of the corner section. It is found that the corner section can be lit on when the corner section is observed along the direction tangent to the corner section.

15 Claims, 6 Drawing Sheets

(51) Int. Cl.
*F21S 43/245* (2018.01)
*F21V 8/00* (2006.01)

(56) References Cited

U.S. PATENT DOCUMENTS

| | | |
|---|---|---|
| 2011/0103084 A1 | 5/2011 | Zwick |
| 2013/0003398 A1 | 1/2013 | Godbillon |
| 2013/0215633 A1 | 8/2013 | Wuerthele et al. |
| 2014/0293630 A1* | 10/2014 | Domini ............... F21S 43/245 362/487 |
| 2016/0076720 A1* | 3/2016 | Nantais ............... F21S 43/19 362/511 |
| 2016/0215950 A1 | 7/2016 | Ender et al. |
| 2016/0356446 A1* | 12/2016 | Okada ............... F21S 43/241 |
| 2017/0234501 A1* | 8/2017 | Hanami ............... F21S 43/245 362/511 |
| 2018/0195682 A1* | 7/2018 | Fisher ............... F21S 43/40 |
| 2019/0023176 A1* | 1/2019 | Ishizaka ............... B60Q 1/2696 |

FOREIGN PATENT DOCUMENTS

| | | |
|---|---|---|
| CN | 215216048 U | 12/2021 |
| EP | 2 317 212 A1 | 5/2011 |
| EP | 2 669 721 A1 | 12/2013 |
| EP | 3 208 525 A1 | 8/2017 |
| EP | 3 450 834 A1 | 3/2019 |
| JP | 2015-156340 A | 8/2015 |
| JP | 2016-39121 A | 3/2016 |
| WO | WO 2014/105408 A2 | 7/2014 |

OTHER PUBLICATIONS

Extended European Search Report issued Sep. 18, 2024, in corresponding European Patent Application No. 22794824.7, 8 pages.

* cited by examiner

LIGHT GUIDING DEVICE, VEHICLE LAMP AND VEHICLE

TECHNICAL FIELD

The present invention relates to the technical field of vehicle lamps, and in particular to a light guiding device, a vehicle lamp and a vehicle.

BACKGROUND ART

Lighting devices are indispensable components in lighting and/or optical signal indicating devices of all kinds, being used to provide light for lighting and/or optical indication, and widely applied in various fields; for example, lighting devices such as vehicle lamps are used in motor vehicles to ensure safe travel. In motor vehicles, various types of lights are often required to implement different functions, including the headlight, fog light, tail light, turn signals, brake light, side marker light, parking light, etc.

To meet styling requirements, vehicle lamps sometimes need to extend along both the length and the width of a vehicle, i.e., cover the corners of a vehicle. In this case, when observed right in front of a vehicle lamp along the length of the vehicle, a corner area of the vehicle is hardly observed to be lit because it is almost tangent to the length direction.

SUMMARY OF THE INVENTION

Therefore, the purpose of the present invention is to provide a light guiding device, a vehicle lamp and a vehicle, which can at least partially solve the abovementioned problem.

According to one aspect of the present invention, a light guiding device is provided, comprising a first light guide, which comprises an end surface, a corner section and a downstream section, wherein the corner section of the first light guide has a corner and is closer to the end surface of the first light guide than the downstream section;

light incident surfaces of the first light guide comprise the end surface of the first light guide, and an inner side surface of the corner section of the first light guide located on the inner side of the corner; and light exit surface of the first light guide comprises an outer side surface of the first light guide located on the outer side of the corner.

According to the embodiments of the present invention, the light incident surfaces of the first light guide additionally comprise the inner side surface of the corner section, incident light from the inner side surface of the corner section will be able to exit from the outer side surface of the corner section along a direction tangent to the corner section, and thus it is found that the corner section can be lit when the corner section is observed along the direction tangent to the corner section.

In one type of embodiment, the light incident surface and the light exit surface of the corner section of the first light guide are shaped such that light emitted from the light exit surface of the corner section of the first light guide is not converged.

According to the embodiments of the present invention, by defining the shapes of the light incident surface and the light exit surface of the corner section of the first light guide, light emitted from the light exit surface of the corner section of the first light guide will not converge, thus preventing prominent bright lines in the lighting appearance of the corner section.

In one type of embodiment, the light exit surface of the corner section of the first light guide has optical protrusions, to improve scattering of exit light.

In one type of embodiment, the corner section of the first light guide and the downstream section of the first light guide have different cross-sectional shapes.

If the downstream section has a cross-sectional shape that does not converge light, like that of the corner section, the optical efficiency of the light propagating in the downstream section will not be very high. Therefore, the embodiments of the present invention define that the corner section of the first light guide and the downstream section of the first light guide have different cross-sectional shapes.

In one type of embodiment, the downstream section of the first light guide has a round cross section.

According to the embodiments of the present invention, total reflection easily occurs for light in a round light guide, which is beneficial for improving the optical efficiency. Furthermore, light emitted from a round light guide meets regulatory requirements more easily.

In one type of embodiment, an inner side surface of the downstream section of the first light guide located on the inner side of the corner comprises optical protrusions, to scatter light toward the light exit surface of the first light guide.

In one type of embodiment, the first light guide further comprises a transition section, and the cross-sectional shape of the transition section of the first light guide is intermediate between the cross-sectional shape of the corner section of the first light guide and the cross-sectional shape of the downstream section of the first light guide.

In the case where the cross-sectional shapes of the corner section and the downstream section are different, if the corner section and the downstream section are directly connected, some light will leak from the first light guide from the connection between the corner section and the downstream section. In the embodiments of the present invention, this problem can be solved by providing a transition section.

According to another aspect of the present invention, a vehicle lamp is also provided, comprising any of the light guiding devices described above.

In one type of embodiment, the light guiding device further comprises a second light guide, the second light guide is stacked with the first light guide in the direction of the height of the vehicle lamp and extends along the first light guide; a light incident surface of the second light guide comprises an end surface, and a light exit surface of the second light guide comprises an outer side surface of a downstream section of the second light guide located on the outer side of the corner.

In one type of embodiment, the vehicle lamp further comprises a first lens and a second lens that have different colours, the first lens may be used to emit exit light from the second light guide, and the second lens may be used to emit exit light from the first light guide.

According to the embodiments of the present invention, the first light guide and the second light guide cooperate with the first lens and the second lens, thus providing a unique lighting appearance of the vehicle lamp.

According to yet another aspect of the present invention, a vehicle is also provided, comprising any of the light guiding devices described above, or any of the vehicle lamps described above.

BRIEF DESCRIPTION OF THE FIGURES

The above-described characteristics, technical features and advantages of the present invention and modes of implementation thereof will be further explained below in a clear and easy-to-understand manner through a description of preferred embodiments with reference to the drawings, wherein.

DETAILED DESCRIPTION OF THE EMBODIMENTS

Embodiments of the present invention are described demonstratively below. As those skilled in the art should realize, the embodiments explained may be amended in various ways without departing from the concept of the present invention. Accordingly, the drawings and the description are exemplary and not restrictive in nature. In the following text, identical drawing reference labels generally indicate functionally identical or similar elements.

Figure 1:
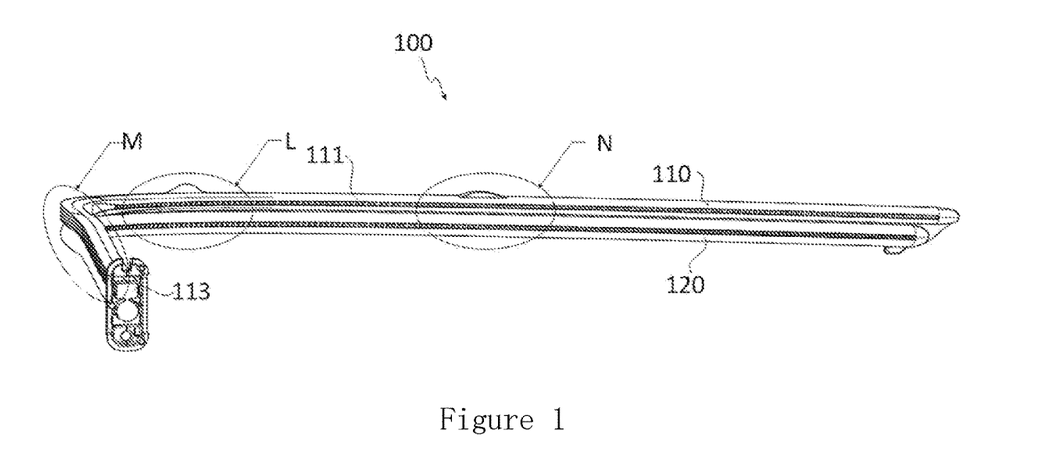
FIG. 1 is a back view of the light guiding device 100 according to one embodiment of the present invention.
Figure 2:
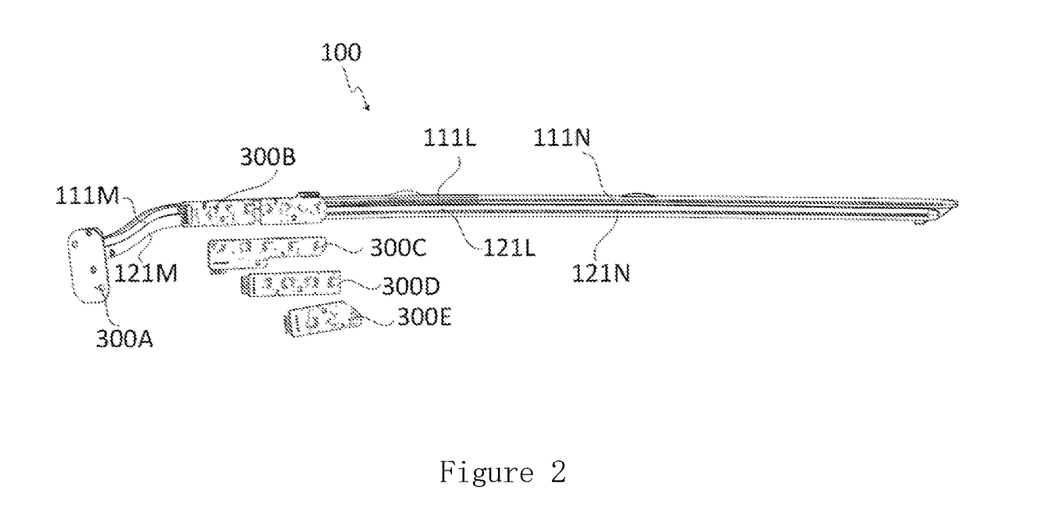
FIG. 2 is a back view of the light guiding device 100 fitted with a printed circuit board according to one embodiment of the present invention.
Figure 3:
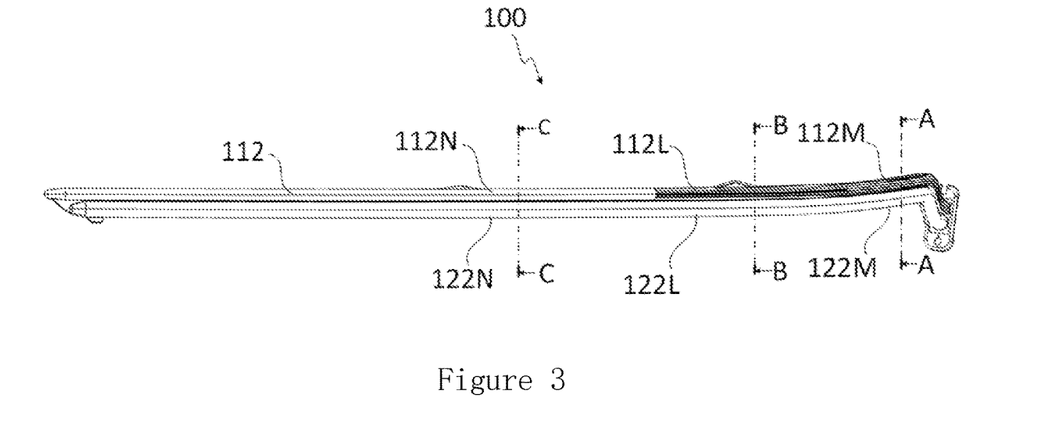
FIG. 3 is a front view of the light guiding device 100 according to one embodiment of the present invention.
Figure 4:
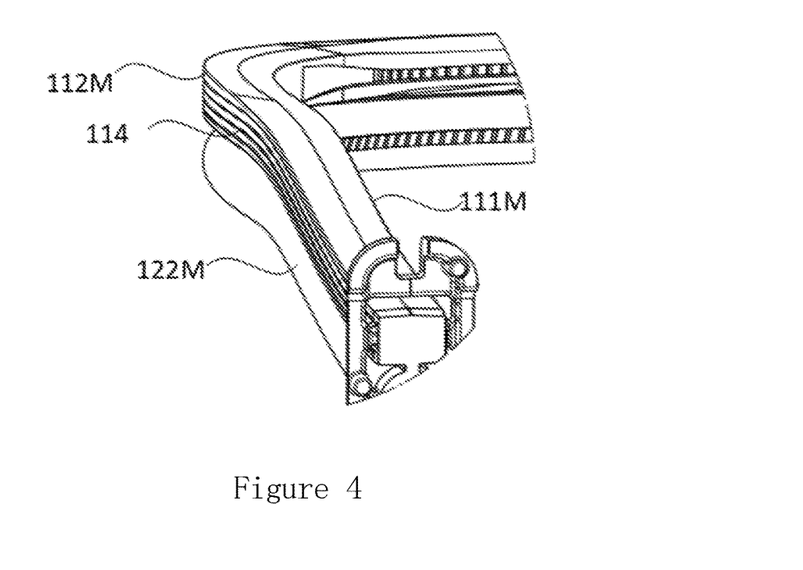
FIG. 4 is a detail back view of the corner section M in FIG. 1.
Figure 5:
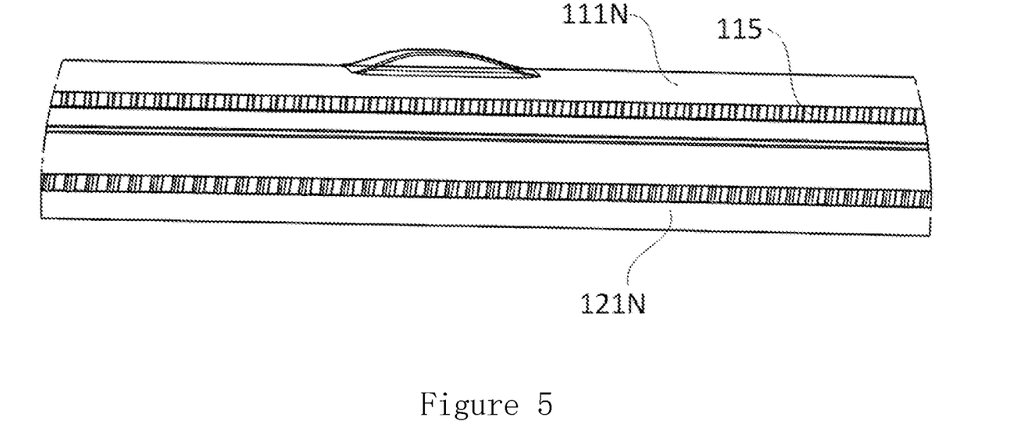
FIG. 5 is a detail back view of the downstream section N in FIG. 1.
Figure 6:
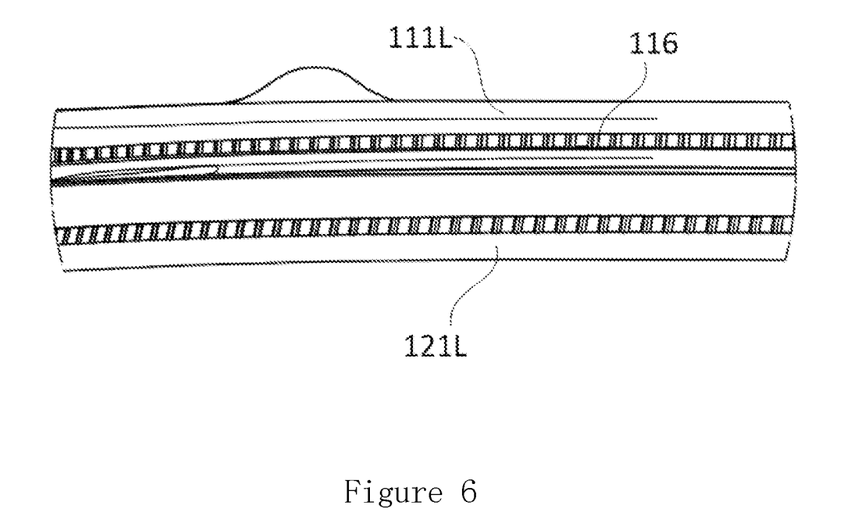
FIG. 6 is a detail back view of the transition section L in FIG. 1.

FIG. 1 is a back view of the light guiding device 100 according to one embodiment of the present invention, FIG. 2 is a back view of the light guiding device 100 fitted with a printed circuit board according to one embodiment of the present invention, FIG. 3 is a front view of the light guiding device 100 according to one embodiment of the present invention, FIG. 4 is a detail back view of the corner section M in FIG. 1, FIG. 5 is a detail back view of the downstream section N in FIG. 1, and FIG. 6 is a detail back view of the transition section L in FIG. 1.

As shown in FIGS. 1 to 3, the light guiding device 100 comprises a first light guide 110, the first light guide 110 is arc shaped as a whole, or has a corner, and the first light guide 110 may comprise an end surface 113, an inner side surface 111 and an outer side surface 112, wherein the inner side surface 111 and the outer side surface 112 are located on two opposite sides of the first light guide 110, specifically, the inner side surface 111 is the surface located on the inner side of the corner, and the outer side surface 112 is the surface located on the outer side of the corner. The first light guide 110 further comprises a corner section M and a downstream section N, wherein the corner section M comprises the aforementioned corner, and the corner section M is closer to the end surface 113 than the downstream section Nis. In addition, the inner side surface 111 may comprise a surface 111M of the corner section M located on the inner side of the corner (hereinafter referred to as the inner side surface 111M) and a surface 111N of the downstream section N located on the inner side of the corner (hereinafter referred to as the inner side surface 111N); the outer side surface 112 may comprise a surface 112M of the corner section M located on the outer side of the corner (hereinafter referred to as the outer side surface 112M) and a surface 112N of the downstream section N located on the outer side of the corner (hereinafter referred to as the outer side surface 112N).

The light incident surface of the first light guide 110 may comprise the end surface 113 and the inner side surface 111M of the corner section M. The light exit surface of the first light guide 110 may comprise the outer side surface 112 of the first light guide 110.

For the first light guide 110, if light is only incident on the end surface 113 of the first light guide 110, and scattering means such as sawteeth are provided on the inner side surface 111 of the first light guide 110 to break the total reflection of the light in the first light guide 110, so that the light finally exits from the outer side surface 112 of the first light guide 110, when the corner section M is observed in the direction perpendicular to the paper surface in FIG. 3, it will be found that the corner section M is not lit, because the direction perpendicular to the paper surface is almost tangent to the corner section M, while the scattering means such as sawteeth on the inner side surface 111 cannot scatter the light in the direction perpendicular to the paper surface. In the embodiments of the present invention, the light incident surface of the first light guide 110 additionally comprises the inner side surface 111M of the corner section M, so that incident light from the inner side surface 111M of the corner section M will be able to exit from the outer side surface 112M of the corner section M along a direction perpendicular to the paper surface, and thus it will be found that the corner section M can be lit when the corner section M is observed along the direction perpendicular to the paper surface.

In the case of an additional light source on the inner side surface 111M of the corner section M, if the corner section M has a round cross section, since both the inner side surface 111M and the outer side surface 112M of the corner section M have the function of converging light, the light emitted from the outer side surface 112M of the corner section M will be converged, so that prominent bright lines will appear in the lighting appearance of the corner section M.

In order to further solve the above problem, in the embodiments of the present invention, the shapes of the light incident surface and the light exit surface (i.e., the inner side surface 111M and the outer side surface 112M) of the corner section M are defined so that light emitted from the outer side surface 112M will not converge, which means that light exits from the outer side surface 112M in a parallel state or a scattered state.

In one type of example, both the inner side surface 111M and the outer side surface 112M of the corner section M are planes. For example, without limitation, the corner section M has an essentially rectangular (including square) cross section.

In another type of example, the corner section M has a cross section of a concave lens, for example, a biconcave lens, a planoconcave lens or a convexo-concave lens.

In addition, in order to further improve the degree of scattering or uniformity of the light emitted from the corner section M, in the embodiments of the present invention, as shown in FIG. 1 and FIG. 4, a plurality of optical protrusions 114 are provided on the light exit surface of the corner section M, i.e., the outer side surface 112M, wherein examples of the optical protrusions 114 include, but are not limited to, strip-shaped protrusions, spherical protrusions, conical protrusions, polyhedral protrusions, etc.

Since the downstream section N is located downstream of the corner section M in the propagation direction of the light incident from the end surface 113, it is necessary to improve the optical efficiency of the light propagating in the downstream section N, to prevent the lighting appearance of the downstream section M from becoming darker along the direction of light propagation. For this, in the embodiments of the present invention, it is defined that the corner section M and the downstream section N have different cross-sectional shapes. If the downstream section N has a cross-sectional shape that does not converge light, like that of the corner section M, the optical efficiency of the light propagating in the downstream section N will not be very high. In one type of example, the downstream section N has a round cross section. Total reflection easily occurs for light in a round light guide, which is beneficial for improving the optical efficiency. Furthermore, light emitted from a round light guide meets regulatory requirements more easily.

As shown in FIG. 5, the inner side surface 111N of the downstream section N is provided with optical protrusions 115 for scattering light, so that the light can be uniformly emitted from the outer side surface 112N of the downstream section N. Examples of the optical protrusions 115 may include, but are not limited to, sawteeth.

In the case where the cross-sectional shapes of the corner section M and the downstream section N are different, if the corner section M and the downstream section N are directly connected, some light will leak from the first light guide 100 from the connection between the corner section M and the downstream section N. For this, in the embodiments of the present application, as shown in FIGS. 1 to 3 and FIG. 6, the first light guide 100 additionally comprises a transition section L, wherein the cross-sectional shape of the transition section L is intermediate between the cross-sectional shape of the corner section M and the cross-sectional shape of the downstream section N, thereby slowly transitioning the cross-sectional shape of the corner section M to the cross-sectional shape of the downstream section N, and preventing light leakage.

Figure 7A:
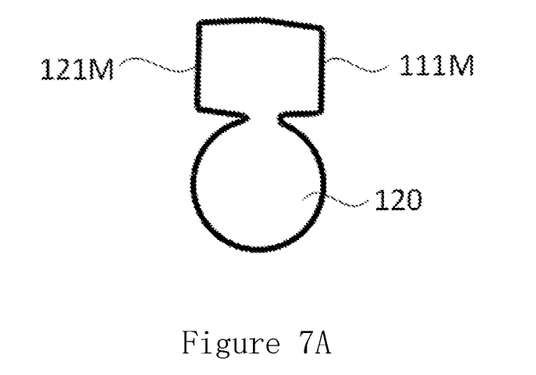
FIG. 7A is a profile view of the light guiding device 100 in FIG. 3 along line A-A.
Figure 7B:
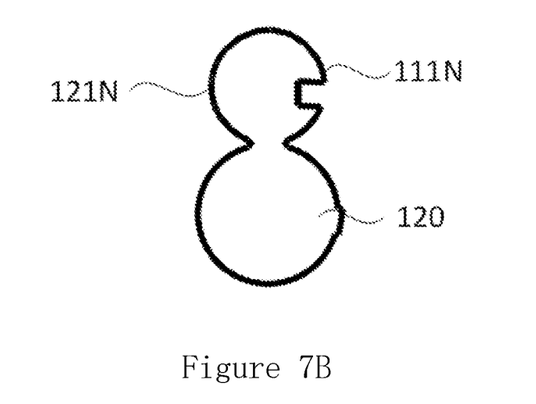
FIG. 7B is a profile view of the light guiding device 100 in FIG. 3 along line B-B.
Figure 7C:
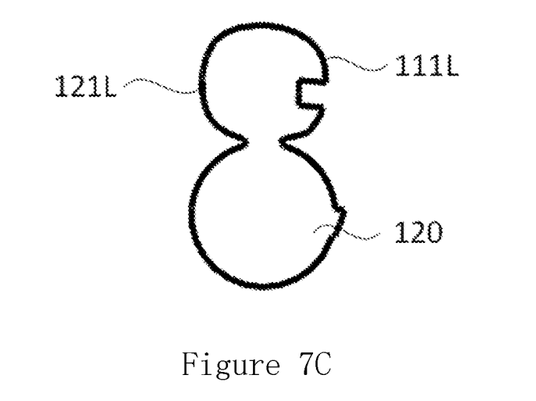
FIG. 7C is a profile view of the light guiding device 100 in FIG. 3 along line C-C.

As an example of the above embodiment, FIG. 7A is a profile view of the light guiding device 100 in FIG. 3 along line A-A, FIG. 7B is a profile view of the light guiding device 100 in FIG. 3 along line B-B, and FIG. 7C is a profile view of the light guiding device 100 in FIG. 3 along line C-C. As shown in FIGS. 7A to 7C, the corner section M has a rectangular cross-sectional shape, the downstream section N has a round cross-sectional shape, and the transition section L has a cross-sectional shape intermediate between rectangular and round.

As shown in FIGS. 2, 3 and 6, the transition section L comprises an inner side surface 111L located on the inner side of the corner and an outer side surface 112L located on the outer side of the corner, wherein the inner side surface 111L is provided with optical protrusions 116 for scattering light, so that the light can be uniformly emitted from the outer side surface 112L. In addition, the outer side surface 112L may also be provided with optical protrusions. In the propagation direction of the light incident from the end surface 113, the degree of protrusion of the optical protrusions gradually decreases, so that the outer side surface 112M of the corner section M gradually transitions to the outer side surface 112N of downstream section N.

Figure 8:
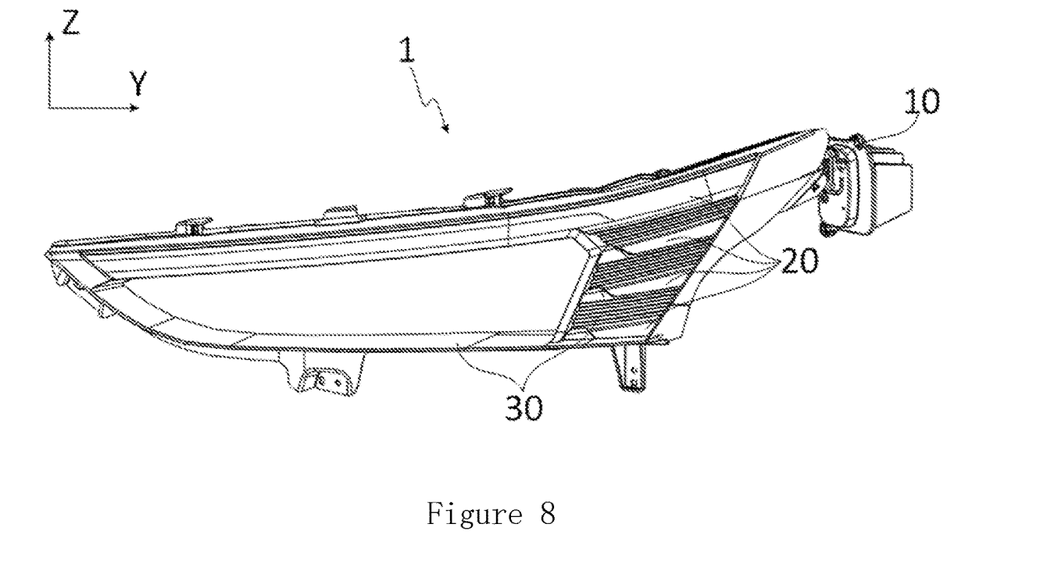
FIG. 8 is a front view of the vehicle lamp 1 using the light guiding device 100 according to one embodiment of the present invention.
Figure 9:
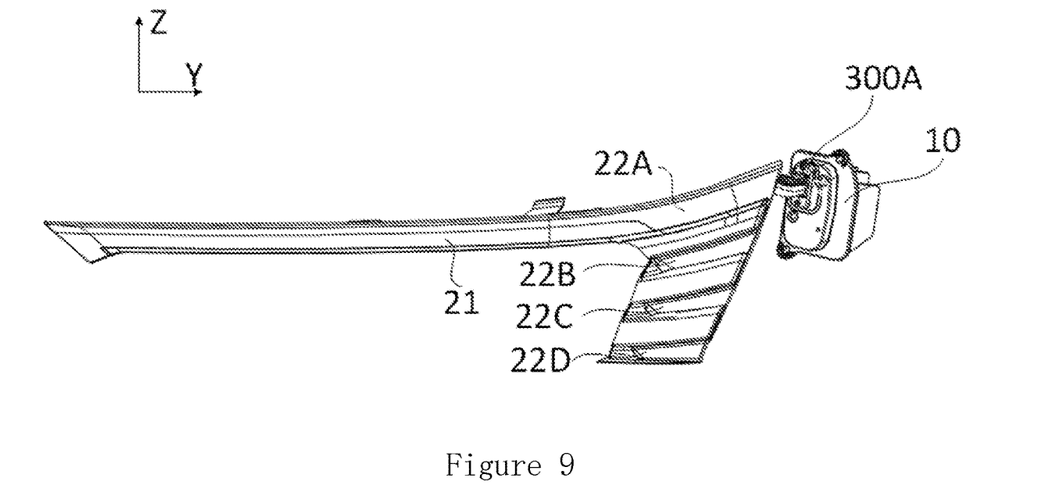
FIG. 9 is a front view of the vehicle lamp 1 in FIG. 8 without the decorative frame 30.
Figure 10:
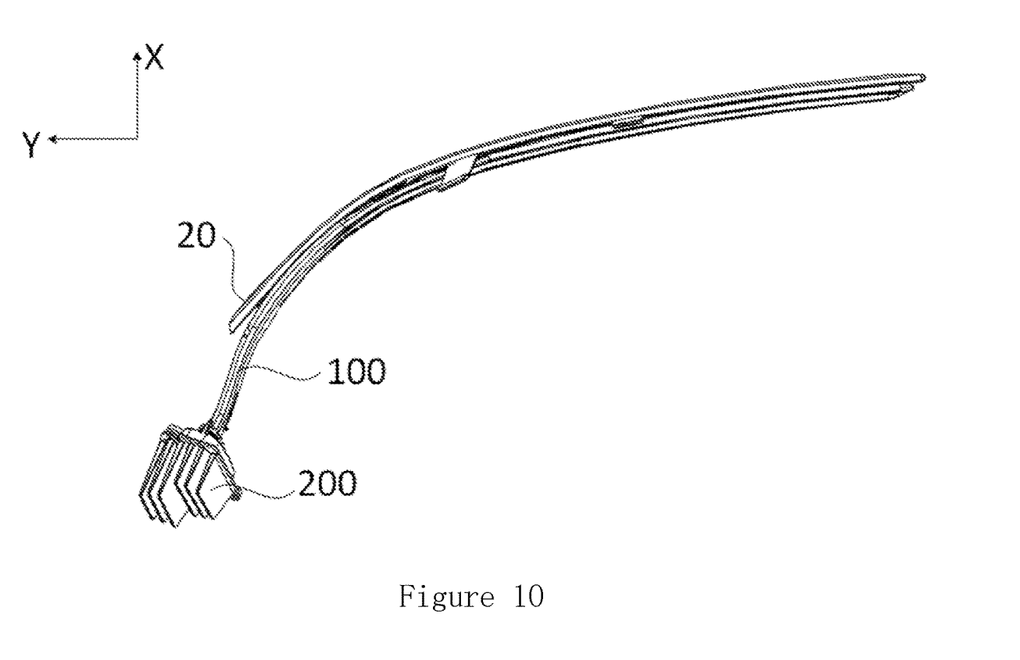
FIG. 10 is a top view of the vehicle lamp 1 in FIG. 9.
Figure 11:
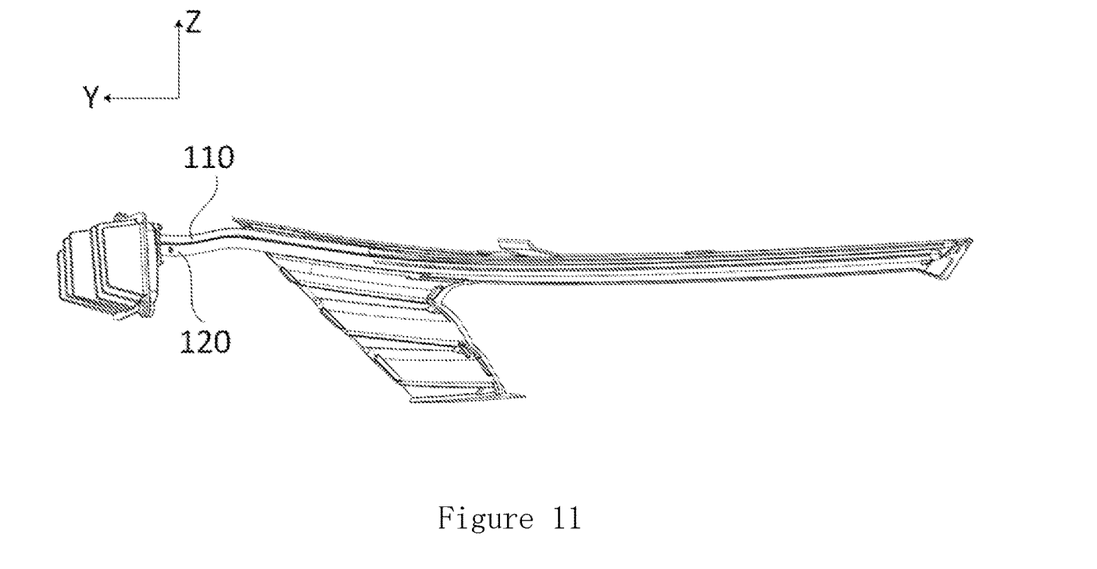
FIG. 11 is a back view of the vehicle lamp 1 in FIG. 9.

FIG. 8 is a front view of the vehicle lamp 1 using the light guiding device 100 according to one embodiment of the present invention, FIG. 9 is a front view of the vehicle lamp 1 in FIG. 8 without the decorative frame 30, FIG. 10 is a top view of the vehicle lamp 1 in FIG. 9, and FIG. 11 is a back view of the vehicle lamp 1 in FIG. 9, wherein X represents the length direction of the vehicle lamp, Y represents the width direction of the vehicle lamp, and Z represents the height direction of the vehicle lamp. As shown in FIGS. 8 to 11, the vehicle lamp 1 has a corner spanning the length direction X and the width direction Y of the vehicle lamp 1, and the vehicle lamp 1 comprises a lighting component 10, a lens 20 and a decorative frame 30, wherein the lighting component 10 is integrally located behind the lens 20 and the decorative frame 30.

The lighting component 10 may comprise the light guiding device 100 as described above, a printed circuit board, and a bracket 200 for the printed circuit board, wherein the printed circuit board is used to carry a light source. FIG. 2 shows a plurality of printed circuit boards, i.e., printed circuit boards 300A, 300B, 300C, 300D, and 300E. The printed circuit board 300A is provided at the end surface 113 of the light guiding device 100, for a light source thereon to emit light to the end surface 113. The printed circuit board 300B is provided at the inner side surface 111M of the corner section M, for a light source thereon to emit light to the inner side surface 111M. The printed circuit boards 300C, 300D, and 300E are provided below the printed circuit board 300B, for a light source thereon to emit light to different parts of the lens 20. In one non-limiting embodiment, the bracket 200 may comprise a radiator with a plurality of cooling ribs.

As shown in FIGS. 1 to 11, the light guiding device 100 may further comprise a second light guide 120, and the second light guide 120 is stacked with the first light guide 110 in the height direction of the vehicle lamp 1. As a non-limiting embodiment, the second light guide 120 is provided under the first light guide 110 in the height direction of the vehicle lamp 1, and extends along the first light guide 110. In other words, the second light guide 120 is also arc shaped or has a corner as a whole, and also comprises a corner section M, a downstream section N and a transition section L. The light incident surface of the second light guide 120 comprises an end surface. For example, without limitation, the second light guide 120 may share the printed circuit board 300A with the first light guide 110. The light exit surface of the second light guide 120 comprises the outer side surface 122N of the downstream section N of the second light guide 120 and the outer side surface 122L of the transition section L, wherein the outer side surface 122N of the downstream section N of the second light guide 120 is the surface of the downstream section N of the second light guide 120 located on the outer side of the corner, and the outer side surface 122L of the transition section L of the second light guide 120 is the surface of the transition section L of the second light guide 120 located on the outer side of the corner. Correspondingly, on the inner side surface 121N of the downstream section N of the second light guide 120 opposite to the outer side surface 122N, and on the inner side surface 121L of the transition section L of the second light guide 120 opposite to the outer side surface 122L, there are also optical protrusions for scattering light, so that the light exits from the outer side surface 122N and outer side surface 122L evenly. Examples of the optical protrusions may include, but are not limited to, sawteeth. It should be noted that the outer side surface 122M of the corner section M of the second light guide 120 is not used as a light exit surface, and accordingly, the inner side surface 121M of the corner section M of the second light guide 120 may not be provided with optical protrusions.

In another aspect, as shown in FIGS. 7A to 7C, the second light guide 120 may have a round cross section as a whole. In other words, the corner section M, the downstream section N and the transition section L of the second light guide 120 have the same round cross section, which improves optical efficiency. Of course, the second light guide 120 may also have a cross section of other shapes.

As shown in FIG. 9, the lens 20 may comprise a first lens 21 and a second lens that have different colours, wherein the second lens comprises lens portions 22A, 22B, 22C and 22D. In one non-limiting example, the first lens 21 may be colourless and transparent, and the second lens may be a coloured lens. The first lens 21 may be used to emit the light emitted from the second light guide 120, the lens portion 22A of the second lens may be used to emit the light emitted from the first light guide 110, and the lens portions 22B, 22C and 22D may be used to emit light from the light sources carried by the aforementioned circuit boards 300C, 300D and 300E, and the vehicle lamp 1 will thereby have a unique lighting appearance.

The decorative frame 30 is disposed around the first lens 21 and the second lens, and covers part of the second lens, so that only the lens portions 22A, 22B, 22C and 22D of the second lens can be seen when observed right in front of the lamp 1 along the length direction of the lamp 1.

Although the vehicle lamp 1 according to the embodiments of the present invention has a corner spanning the length direction X and the width direction Y, due to the use of the improved light guiding device 100, the lens portion 22A of the second lens can be seen to be lit when the vehicle lamp 1 is viewed along the length direction X. In addition, by use of the first light guide 100 and the second light guide 200 at the same time, a unique lighting appearance can be achieved.

According to the embodiments of the present invention, a vehicle is also provided, comprising the light guiding device 100 or the vehicle lamp 1 described above.

The present invention is not limited to the structure described above; various other variants could also be used. Although the present invention has already been described by means of a limited number of embodiments, those skilled in the art could, drawing benefit from this disclosure, design other embodiments which do not depart from the scope of protection of the present invention disclosed herein. Thus, the scope of protection of the present invention should be defined by the attached claims alone.

The invention claimed is:

1. A light guiding device, comprising a first light guide, wherein,
   the first light guide comprises an end surface, a corner section, a downstream section, and a transition section between the corner section and the downstream section, wherein the corner section of the first light guide has a corner and is closer to the end surface of the first light guide than the downstream section of the first light guide;
   light incident surfaces of the first light guide comprise the end surface of the first light guide and an inner side surface of the corner section of the first light guide located on an inner side of the corner; and
   a light exit surface of the first light guide comprises an outer side surface of the first light guide located on an outer side surface of the corner, wherein
   the corner section has an approximately rectangular cross-section shape formed by the inner side surface of the corner and the outer side surface of the corner, the downstream section has a round cross-section shape, the transition section has an intermediate cross-section shape that has rounded corners, and the intermediate cross-section shape of the transition section is intermediate between the approximately rectangular cross-section shape of the corner section and the round cross-section shape of the downstream section.

2. The light guiding device according to claim 1, wherein the light incident surface and the light exit surface of the corner section of the first light guide are shaped such that light emitted from the light exit surface of the corner section of the first light guide is not converged.

3. The light guiding device according to claim 2, wherein the light exit surface of the corner section of the first light guide has optical protrusions, to improve scattering of exit light.

4. The light guiding device according to claim 1, wherein an inner side surface of the downstream section of the first light guide located on the inner side of the corner comprises optical protrusions, to scatter light toward the light exit surface of the first light guide.

5. A vehicle lamp, wherein the vehicle lamp comprises the light guiding device according to claim 1.

6. The vehicle lamp according to claim 5, further comprising a first lens and a second lens, wherein the light guiding device further comprises a second light guide, and the second light guide is stacked with the first light guide in a direction of a height of the vehicle lamp and extends along the first light guide,
   a light incident surface of the second light guide comprises an end surface of the second light guide, and a light exit surface of the second light guide comprises an outer side surface of a downstream section of the second light guide located on the outer side surface of the corner, and
   the first lens is used to emit exit light from the second light guide and the second lens is used to emit light from the first light guide.

7. The vehicle lamp according to claim 6, wherein the first lens and the second lens have different colours.

8. A vehicle, wherein the vehicle comprises the light guiding device according to claim 1.

9. A vehicle lamp, wherein the vehicle lamp comprises the light guiding device according to claim 2.

10. A vehicle comprising the vehicle lamp according to claim 5.

11. A vehicle lamp, wherein the vehicle lamp comprises the light guiding device according to claim 3.

12. A vehicle comprising the light guiding device according to claim 3.

13. A vehicle lamp, wherein the vehicle lamp comprises the light guiding device according to claim 4.

14. A vehicle comprising the vehicle lamp according to claim 6.

15. A vehicle comprising the light guiding device according to claim 4.

* * * * *